(12) United States Patent
Herley et al.

(10) Patent No.: US 7,089,464 B2
(45) Date of Patent: *Aug. 8, 2006

(54) SYSTEM AND METHOD FOR TRANSPARENT ELECTRONIC DATA TRANSFER USING ERROR CORRECTION TO FACILITATE BANDWIDTH-EFFICIENT DATA RECOVERY

(75) Inventors: Cormac Herley, Bellevue, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/230,792

(22) Filed: Sep. 19, 2005

(65) Prior Publication Data

US 2006/0015782 A1    Jan. 19, 2006

Related U.S. Application Data

(63) Continuation of application No. 10/183,581, filed on Jun. 26, 2002, now Pat. No. 6,948,104.

(51) Int. Cl.
*H03M 13/39*    (2006.01)

(52) U.S. Cl. .................................... 714/712; 714/776
(58) Field of Classification Search .................. None
See application file for complete search history.

(56) References Cited

U.S. PATENT DOCUMENTS 6,996,097 B1 *   2/2006   Chou et al. ................. 714/746

\* cited by examiner

*Primary Examiner*—R. Stephen Dildine
(74) *Attorney, Agent, or Firm*—Lyon & Harr, L.L.P.; Craig S. Fischer

(57) ABSTRACT

The invention disclosed herein includes a system and method for electronically transferring data through a communications connection in a transparent manner such that the data transfer does not interfere with other traffic sharing the connection. The invention transfers data using bandwidth of the connection that other traffic are not using. If other traffic desires to use the bandwidth currently being used by the invention, the invention relinquishes the bandwidth to the other traffic and retreats to avoid bandwidth contention. Although a retreat may cause gaps in the data transferred, a key aspect of the invention is that any missing data due to these gaps is recovered easily and in a bandwidth-efficient way using novel error correction and recovery.

18 Claims, 10 Drawing Sheets

SYSTEM AND METHOD FOR TRANSPARENT ELECTRONIC DATA TRANSFER USING ERROR CORRECTION TO FACILITATE BANDWIDTH-EFFICIENT DATA RECOVERY

CROSS REFERENCE TO RELATED APPLICATIONS

This application is a continuation of U.S. patent application Ser. No. 10/183,581, entitled "System and Method for Transparent Electronic Data Transfer Using Error Correction to Facilitate Bandwidth-Efficient Data Recovery," filed Jun. 26, 2002, now U.S. Pat. No. 6,948,104, the entire contents of which are hereby incorporated by reference.

TECHNICAL FIELD

The present invention relates in general to electronic data transfer and in particular to a system and a method for transmitting and receiving data in a tractable manner that retreats when congestion is detected such that the data transfer is transparent to other traffic. Although a retreat may cause gaps in the data transferred, any missing data due to these gaps are recovered easily and in a bandwidth-efficient way using a novel error correction and recovery scheme.

BACKGROUND OF THE INVENTION

As technology becomes increasingly a part of current society, the electronic transfer of information and data is becoming more widespread. Electronic data transfer involves the electronic transmission and reception of data. Electronic data transfer may take many forms, such as the broadcasting of network television over the airwaves, cable television delivered by cable to paying subscribers, and the satellite transmission of consumer entertainment.

One of the most popular mediums for electronic data transfer is the World Wide Web (WWW) via the Internet. The Internet facilitates the connection of a multitude of computers to form the WWW, an enormous computer network. In general, a computer network is two or more computing devices that are connected by communication facilities. The network typically includes a server, which is a computing device that provides shared resources to clients on the network, and a client, which is a computing device that accesses the shared network resources provided by the server using the communication facilities. One or more clients may be request information from a server, which then transmits the information to the requesting clients.

A client typically connects to the network using a fixed bandwidth connection, such as a dial-up, a DSL, or a cable modem connection. On a fixed bandwidth connection, each application on the client must compete for the available bandwidth with other applications on the same machine or other machines on the same network. For example, if a user uses a client application to start downloading a large file (such as a video file or software patch) from a web site, and then wants to use a browser application on the client to surf the Internet, both the client application and the browser will be competing for the available bandwidth of the fixed connection.

In general, the user will experience a noticeable reduction in browser performance when using the browser while the large file is downloading. In fact, frequently the experience for the user is that it becomes excruciating slow to continue to do other things like navigate the WWW or check e-mail. These processes become slowed down tremendously by the large file that is being downloaded simultaneously because the download uses a large amount of bandwidth.

One cause of the large reduction in performance when a large file is downloading has to do with the type of protocols involved in transferring data. There are two common protocols that run over Internet Protocol (IP), namely TCP and UDP. In general, TCP is a responsive flow that has a feedback feature that detects congestion. Specifically, by noting that rate at which the client is receiving the data, the server knows the level of congestion in the connection. Using TCP a server begins sending data at a low rate continues increasing the rate so long as the client continues receiving the data. Once the client notifies the server that it is losing portions of the transmitted data, the server backs off the rate at which data is sent. On the other hand, UDP is a non-responsive flow that has essentially no feedback feature. A server using UDP simply sends the data out at a certain rate and has no way of knowing whether the client received the data or not. UDP often is used for real-time streaming of video where there is no time to have feedback.

Another type of non-responsive flow used by servers to transmit data to any client that is listening is multicast. Multicast is a compute network equivalent of broadcasting. Like a television broadcast, there may be a million clients receiving the transmitted data but the server has no way of knowing who is receiving. It is well know that responsive flows, such as TCP, which back off in the presence of congestion, fare poorly when contending for bandwidth with non-responsive flows, such as UDP and multicast.

Because non-responsive flows like UDP have no feedback feature, the server transmitting data to the client has no way of knowing whether the client is receiving all of the data. Some clients may be receiving all of the data, but many clients will be routinely losing a percentage of the data sent for various reasons causing a gap in the downloaded file. Thus, each client generally will have different loss characteristics or loss patterns. The loss patterns may change depending on what is occurring on each client. For example, gaps may be cause in one client by a problem with the network connection, and in another client by the browser being used to surf the WWW.

If the server is multicasting, one solution to gaps is to continuously repeat the multicast. For instance, if a file takes six hours to download and a few packets are missing, the client can listen again around the time the packets are being multicast again. In reality, however, this solution does not work well because it becomes harder to obtain the final packets needed to complete the downloaded file. This is a probability problem known as the "Coupon Collector's Problem", and in the above example the loss of even a few packets might require the client to listen to the multicast another several more times just to acquire a small number of missing packets. If the multicast was six hours long, this process could take several hours or days. This is a highly inefficient use of bandwidth.

Accordingly, a need exists for a system and a method for electronic data transfer that allows recovery from gaps in a bandwidth efficient manner. In addition, there is a need for an electronic data transfer system and method that is transparent to other applications such that contention for the available bandwidth is avoided.

SUMMARY OF THE INVENTION

The present invention includes a system and method for electronically transferring data through a communications connection in a tractable manner such that the data transfer is transparent and does not interfere with other traffic sharing the connection. The invention transfers data using bandwidth of the connection that other traffic are not using. This unused bandwidth is utilized to transfer data without affecting other traffic that may be using other portions of the bandwidth. If other traffic desires to use the bandwidth currently being used by the invention, the invention relinquishes the bandwidth to the other traffic and retreats to avoid bandwidth contention. This retreat normally implies that there will be gaps in the data received. A key aspect of the invention is an organization of the data and an error correction scheme that facilitates recovery of missing data due to these gaps in a bandwidth-efficient manner.

The electronic data transfer system and method of the invention provide several advantages. First, the invention provides highly bandwidth-efficient recovery from gaps due to lost data. This error recovery is independent of the type of loss pattern associated with the client. Second, the error recovery allows the electronic data transfer system and method to be transparent to other applications. In other words, the system and method can back off or stop receiving data altogether when contention for the available bandwidth is detected. For example, if a large video file is being downloaded and the user opens a browser application to surf the Internet, the system and method will slow down or stop downloading the video file so that the user can surf the Internet at full speed. Although backing off or stopping downloading will produce gaps in the video file, obtaining the missing data is not a problem because of efficient error recovery.

The electronic data transfer system of the invention generally includes at least one transmission unit and at least one reception unit. The transmission unit transmits a data signal, which contains data to be transferred, and an error correction signal, which contains error correction data for recovering any missing data. Both the data and the error correction data may be discretized into smaller segments to allow transmission over different channels or frequencies. The transmission unit includes an error correction module, which generates the error correction data. The reception unit includes a transparent download module, which manages the acquisition of the transmitted data, and a data recovery module, which uses error correction data to obtain any data missed during transmission.

In one embodiment of the invention, the electronic data transfer system includes a computer network for transferring data. The computer network includes at least one server computing device that is used to transmit data over a network and at least one client computing device that is used to receive data. The server computing device includes a data socket, supplying data to the client computing device, and an error correction socket, supplying error correction data to the client computing device on an "as needed" basis. One aspect of the invention involves having the server computing device segment the data and error correction data prior to transmission, such as into packets. These packets then are transmitted to the client computing device using a plurality of channels.

The client computing device includes the transparent download module and the data recovery module. The transparent download module includes a plurality of channel downloaders, which obtain the packets transmitted by the server over the plurality of channels, and a policy manager, which oversees the downloading of data from the server to the client by controlling the number of channels used. The policy manager decides how many channel downloaders should be active based on network congestion. The general goal of the policy manager is to have the client computing device subscribe to as many channels as possible without inducing network congestion. If congestion is detected, the policy manager unsubscribes from as many channels as necessary to avoid bandwidth contention.

Whenever the client computing device unsubscribes from channels due to congestion, data packets may be lost, leaving a gap in the data being downloaded from the server. In order to recover the missing packets, the electronic data transfer system of the invention includes an error correction. This error correction includes an error correction data module on the server computing device. The error correction data module uses the discrete data (such as data packets) and a discrete error correction data constructor to generate error correction data packets. The data recovery module on the client computing device includes an equation system constructor and an equation system solver. The equation system constructor uses the error correction data packets, the data packets not received, the number of data packets missing, and the data packets received to construct a system of equations. These system of equations are solved by the equation system solver to recover the missing data packets.

The electronic data transfer method of the invention generally includes transmitting discrete data, transmitting discrete error correction data, and receiving the discrete data. A determination is made whether all of the discrete data was received and, if not, then the discrete error correction data is obtained. The missing discrete data is recovered from the discrete error correction data obtained. A plurality of channel downloaders are used to receive each type of data, and the reception of data is controlled by the policy manager. In addition, when a channel downloader is active it reports a congestion status to the policy manager. The policy manager receives this congestion status from each active channel downloader and, based on this information, decides which whether to active additional channel downloaders or deactivate active channel downloaders.

The error recovery method of the invention occurs on both the server and the client. On the server, discrete error correction data is formed by combining probabilistic weights and each of the discrete data. If the client has not received all of the downloaded discrete data, then the discrete error correction data is obtained and the missing segments of the discrete data are recovered from the discrete error correction data. This is performed on the client by constructing a system of equations from the discrete error correction data obtained and solving these equations for the missing discrete data.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION

I. Introduction

The electronic data transfer system and method set forth herein provides a transparent use of bandwidth for transferring data along with efficient error recovery. Using the invention, a large file may be transferred over a limited bandwidth connection without interfering with other traffic. This is accomplished by relinquishing the bandwidth whenever other traffic is present, such that the large file is received during the times when bandwidth is not being used. As soon as there is other traffic present contending for the bandwidth, the present invention yields to the other traffic. Although surrendering the bandwidth frequently causes gaps in the data received, later acquisition of the missing data is accomplished in a bandwidth-efficient manner using error recovery. This error recovery of the present invention allows k pieces of lost data to be recovered by obtaining k plus a safety value (k+safety value) pieces of error correction data. The error recovery is achieved by constructing the error correction data in a novel manner, as described in detail below.

By way of example, in a computer network environment a client can download from a server a large file having no latency constraint (for example, the file is not a real-time audio or video stream) without interfering with other applications running on the client. Thus, if a user wants to use a browser application to surf the Internet while downloading the large file, the invention will back off or stop altogether the downloading of the file. This avoids slowing down the user's Internet experience. If any packets of data are lost due to the backing off, the acquisition of the lost data is simple and efficient due the error recovery scheme used in the invention.

II. General Overview

The present invention includes an electronic data transfer system and method for transferring data using at least two signals. The first signal includes a data signal containing data to be transferred. This data is typically divided or segmented into discrete data. The second signal is an error correction signal containing error correction data for efficient error recovery. The error correction data includes a probabilistic weighted combination of the discrete data. If any one of the discrete data are lost during the transfer, each of one of the lost discrete data may be obtained by acquiring a small number (relative to the number of discrete data) of the error correction data.

Figure 1:
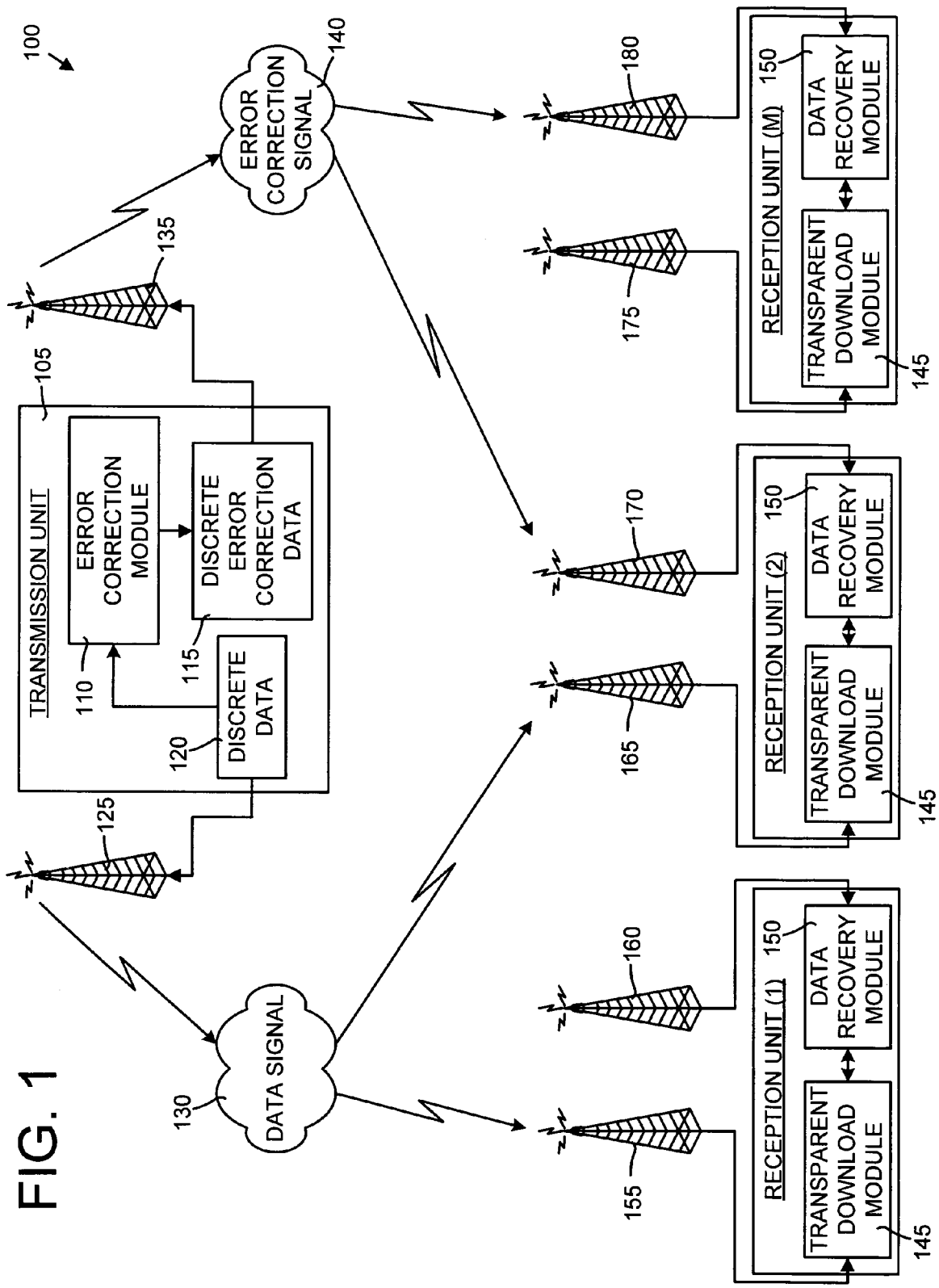
FIG. 1 is a block diagram illustrating a general overview of the electronic data transfer system and method disclosed herein.

FIG. 1 is a block diagram illustrating a general overview of the electronic data transfer system and method disclosed herein. In general, the electronic data transfer system 100 transmits data from a transmission unit 105 to one or more reception units (reception unit (1) to reception unit (M)). The data may be transferred in several ways, such as over the air, using a satellite, or through a wire. The electronic data transfer system 100 transmits the data such that any portion of the data lost in the transmission can be recovered by receiving a minimum amount of error correction data. Specifically, the transmission unit 105 includes an error correction module 110 that generates a discrete error correction data 115 using a discrete data 120. The discrete error correction data 115 and the discrete data 120 are designated as discrete because they are divided into separate segments (such as packets used in a computer network). The discrete data 120 is sent to a first transmission point 125 where the discrete data 120 is transmitted as a data signal 130. Similarly, the discrete error correction data 115 is sent to a second transmission point 135 where the discrete error correction data 115 is transmitted as an error correction signal 140. The data signal 130 and the error correction signal 140 are transmitted on different channels or frequencies. In addition, each of the pieces of discrete data or discrete error correction data may be sent over different channels or frequencies.

Each of the reception units includes a transparent download module 145 and a data recovery module 150. The transparent download module 145 manages the acquisition of the data signal 130. The data recovery module 150 receives the error correction signal and uses the received error correction data to obtain any data missed during transmission. The data signal 130 is received by reception unit (1) using a first reception point 155 and the error correction signal 140 is received using a second reception point 160. Reception unit (2) receives the data signal 130 using a third reception point 165 and the error correction signal 140 using a fourth reception point 170. Similarly, reception unit (M) receives the data signal 130 using a $(M-1)^{th}$ reception point 175 and the error correction signal 140 using a $M^{th}$ reception point 180.

As shown in FIG. 1, depending on the need, each of the reception units can received either the data signal 130, the error correction signal 140, or both. For example, reception unit (1) is obtaining the discrete data 120 by listening to the first reception point 155 and receiving the data signal 130. Reception unit (2) is receiving the data signal 130 and the error correction signal 140. Reception unit (M) is only receiving the error correction signal by listening to the $M^{th}$ reception point 180. This situation may occur if reception unit (M) had previously downloaded the data signal 130 and had not received all of the discrete data 120. Reception unit (M) is listening to the error correction signal to obtain the lost discrete data.

III. Computer Network Implementation Overview

Figure 2:
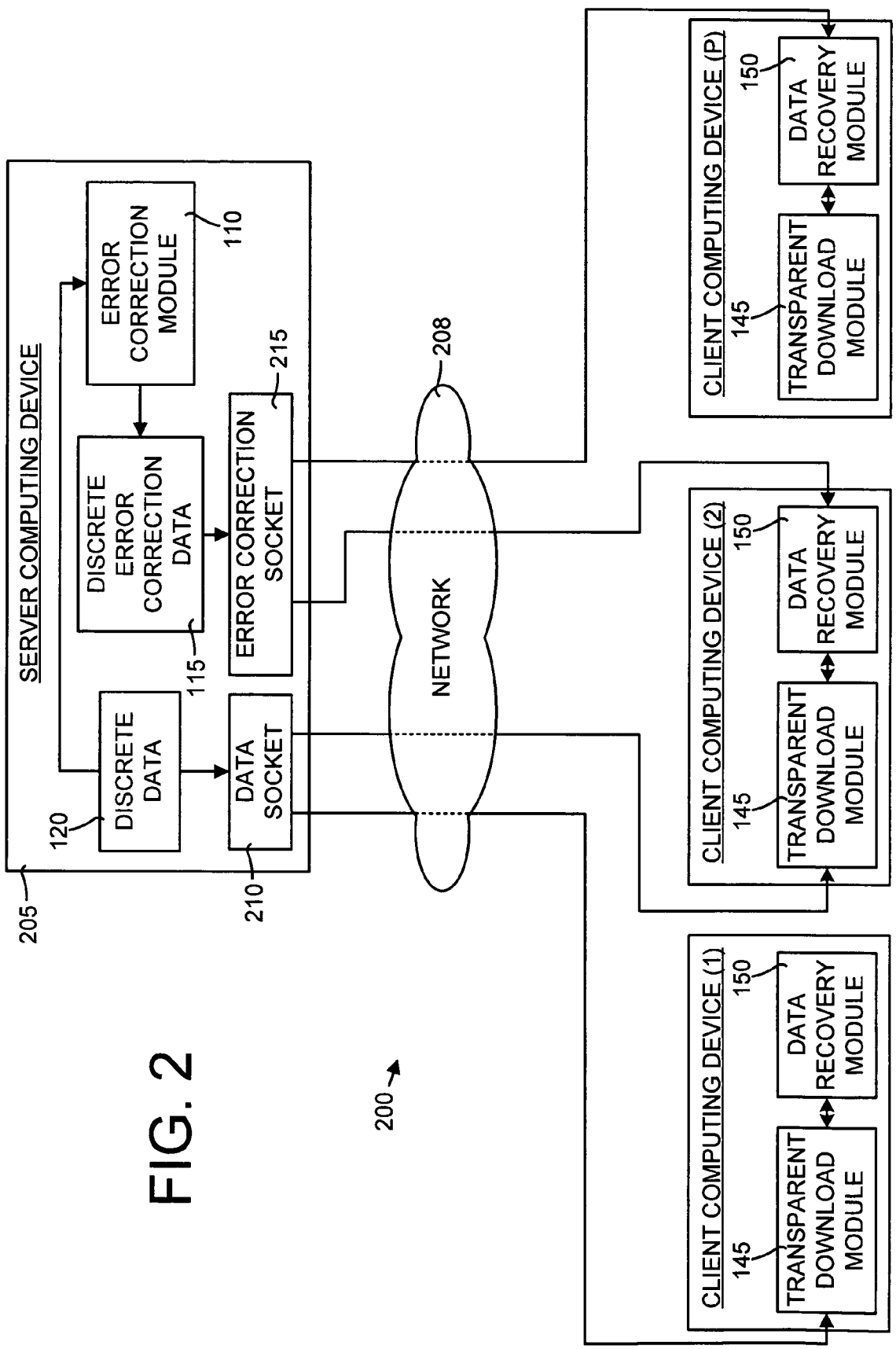
FIG. 2 is a block diagram illustrating a network data transfer system, which is an implementation of the electronic data transfer system and method of FIG. 1 in a computer network environment.

FIG. 2 is a block diagram illustrating a network data transfer system 200, which is an implementation of the electronic data transfer system and method of FIG. 1 in a computer network environment. The network data transfer system 200 includes a server computing device 205, which is an example of the transmission unit 105 of FIG. 1) and a plurality of client computing devices (client computing device (1) to client computing device (P)), which are example of the reception units of FIG. 1. The server computing device 205 serves data to the client computing devices upon request. The server computing device 205 and the client computing devices communicate over a network 208.

The server computing device 205 includes the discrete data 120 and a data socket 210 for transmitting the discrete data 120. In addition, the server computing device 205 includes the discrete error correction data 115 and an error correction socket for transmitting the discrete error correction data 115. The discrete error correction data 115 includes a weighted combination of the discrete data and allows a client computing device to obtain recover missing data packets in an efficient manner. The discrete data 120 and the discrete error correction data 115 are divided into discrete pieces, such as packets of data for sending over the network 208. The data socket 210 and the error correction socket 215 allow the client computing devices to subscribe and obtain the discrete data 120 and discrete error correction data 115 sent by the server computing device. The server computing device 205 also includes the error correction module 110 generating the discrete error correction data 115.

Each of the client computing devices includes the transparent download module 145, for downloading from the server computing device 205 in a transparent manner, and the data recovery module 150, for recovering missing pieces of the discrete data 120 from the discrete error correction data 115. Client computing device (1) is shown listening (or subscribing) to the data socket 210 for obtaining the discrete data 120. Client computing device (2) is shown subscribing to both the data socket 210 and the error correction socket 215 for obtaining both discrete data 120 and discrete error correction data 115. Client computing device (P) is shown subscribing only to the error correction socket 215 to obtain the discrete error correction data 115.

IV. System Details and Exemplary Operating Environment

The network data transfer system 200 shown in FIG. 2 is designed to operate in a computing environment. The follow discussion is intended to provide a brief, general description of a suitable computing environment in which the invention may be implemented.

Figure 3:
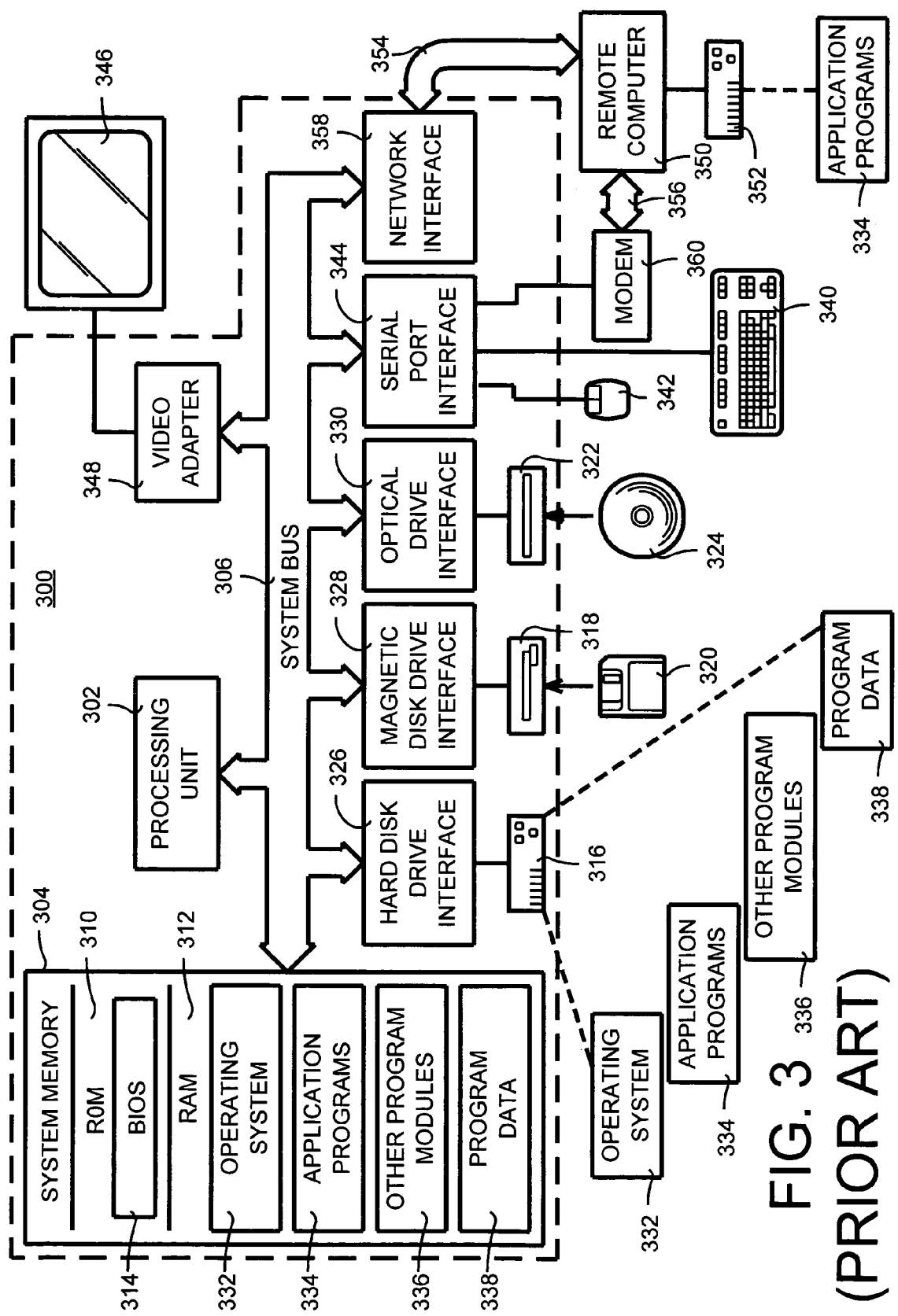
FIG. 3 is a block diagram illustrating a computing apparatus suitable for use with the network data transfer system and method shown in FIG. 2.

FIG. 3 is a block diagram illustrating a computing apparatus suitable for use with the network data transfer system shown in FIG. 2. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 3, an exemplary system for implementing the invention includes a general-purpose computing device 300, where the server computing device 205 and the client computing devices shown in FIG. 2 are examples of the general-purpose computing device 300. In particular, the computing device 300 includes the processing unit 302, a system memory 304, and a system bus 306 that couples various system components including the system memory 304 to the processing unit 302. The system bus 306 may be any of several types of bus structures including a memory bus or memory controller, a peripheral bus, and a local bus using any of a variety of bus architectures. The system memory includes read only memory (ROM) 310 and random access memory (RAM) 312. A basic input/output system (BIOS) 314, containing the basic routines that help to transfer information between elements within the computing device 300, such as during start-up, is stored in ROM 310. The computing device 300 further includes a hard disk drive 316 for reading from and writing to a hard disk, not shown, a magnetic disk drive 318 for reading from or writing to a removable magnetic disk 320, and an optical disk drive 322 for reading from or writing to a removable optical disk 324 such as a CD-ROM or other optical media. The hard disk drive 316, magnetic disk drive 328 and optical disk drive 322 are connected to the system bus 306 by a hard disk drive interface 326, a magnetic disk drive interface 328 and an optical disk drive interface 330, respectively. The drives and their associated computer-readable media provide nonvolatile storage of computer readable instructions, data structures, program modules and other data for the computing device 300.

Although the exemplary environment described herein employs a hard disk, a removable magnetic disk 320 and a removable optical disk 324, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 320, optical disk 324, ROM 310 or RAM 312, including an operating system 332, one or more application programs 334, other program modules 336 and program data 338. A user (not shown) may enter commands and information into the computing device 300 through input devices such as a keyboard 340 and a pointing device 342 (such as a mouse). In addition, other input devices (not shown) may be connected to the computing device 300 including, for example, a microphone, joystick, game pad, satellite dish, scanner, or the like. These other input devices are often connected to the processing unit 302 through a serial port interface 344 that is coupled to the system bus 306, but may be connected by other interfaces, such as a parallel port, a game port or a universal serial bus (USB). A monitor 346, such as a display device, is also connected to the system bus 306 via an interface, such as a video adapter 348. In addition to the monitor 346, computing devices such as personal computers typically include other peripheral output devices (not shown), such as speakers and printers.

The computing device 300 may operate in a networked environment using logical connections to one or more remote computers, such as a remote computer 350. The remote computer 350 may be another personal computer, a server, a router, a network PC, a peer device or other common network node, and typically includes many or all of the elements described above relative to the computing device 300, although only a memory storage device 352 has been illustrated in FIG. 3. The logical connections depicted in FIG. 3 include a local area network (LAN) 354 and a wide area network (WAN) 356. Such networking environments are commonplace in offices, enterprise-wide computer networks, intranets and the Internet.

When used in a LAN networking environment, the computing device 300 is connected to the local network 354 through a network interface or adapter 358. When used in a WAN networking environment, the computing device 300 typically includes a modem 360 or other means for establishing communications over the wide area network 356, such as the Internet. The modem 360, which may be internal or external, is connected to the system bus 306 via the serial port interface 344. In a networked environment, program modules depicted relative to the computing device 300, or portions thereof, may be stored in the remote memory storage device 352. It will be appreciated that the network connections shown are exemplary and other means of establishing a communications link between the computers may be used.

Figure 4:
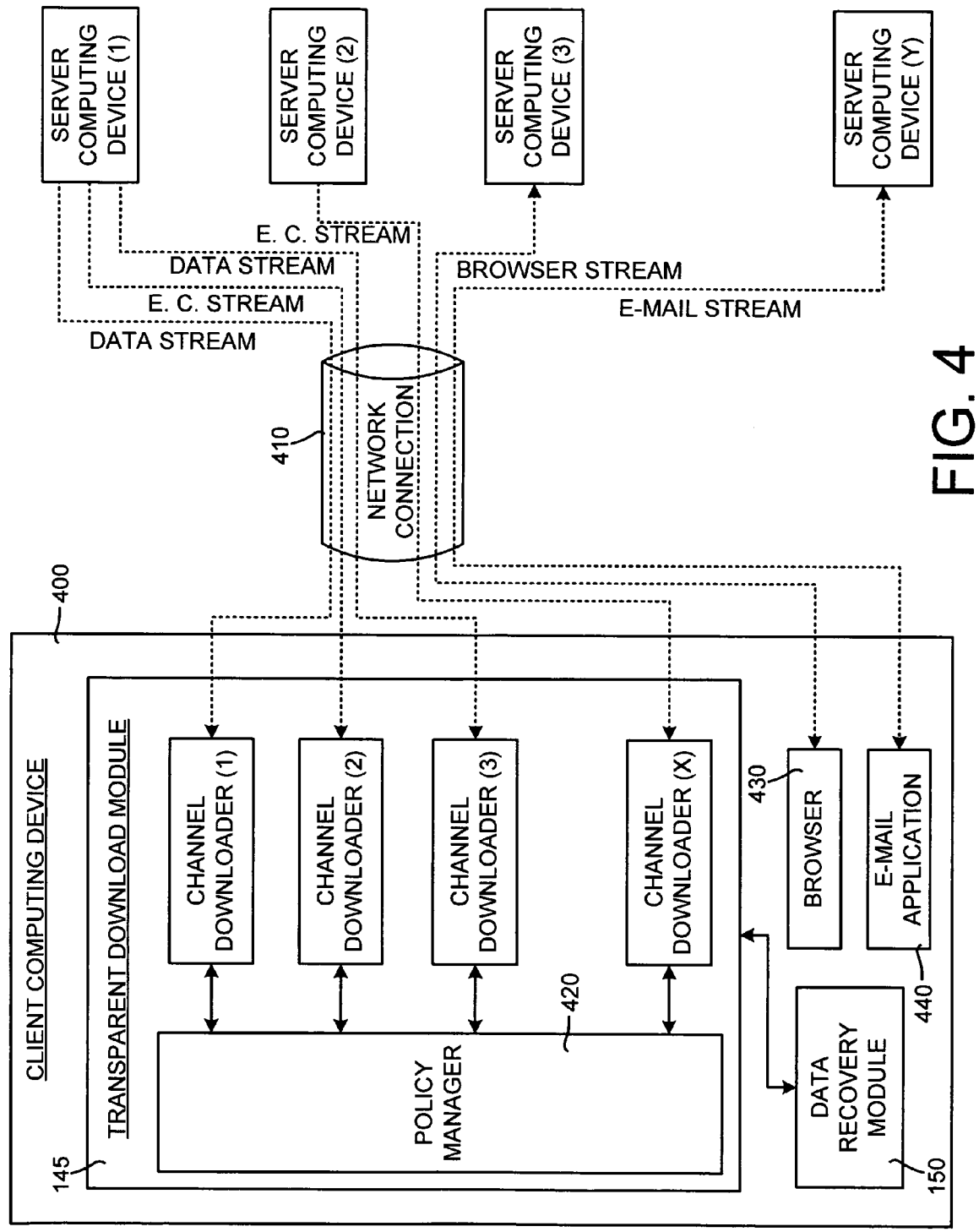
FIG. 4 is a detailed block/flow diagram illustrating data transfer between a client and several servers using the network data transfer system and method.

FIG. 4 is a detailed block/flow diagram illustrating data transfer between a client computing device and several server computing devices using the network data transfer system and method. In general, a client computing device 400, which is an example of the client computing devices shown in FIG. 2, subscribes to different streams of data transmitted by a server computing devices (server computing device (1) to server computing device (Y). The client computing device 400 and the server computing devices communicate through a network connection 410.

The client computing device 400 includes the transparent download module 145 and the data recover module 150. The transparent download module 145 includes a plurality of channel downloaders (channel downloader (1) to channel downloader (X)). The channel downloaders connect (or subscribe) to a particular data stream being sent by a server computing device to download data. The downloading of the data is under the control of a policy manager 420, located on the transparent download module 145, which controls each of the channel downloaders. The policy manager 420 determines how many of the channel downloaders should be active at any time based on congestion in the network connection 410.

The policy manager 420 ensures that the download of data occurs in a transparent manner. For example, if a browser 430 and an e-mail application 440 are using the bandwidth in the network connection 410, the policy manage 420 instructs one or more of the channel downloaders to unsubscribe from a server computing device. If the network connection 410 is clear, then the policy manager 420 instructs one or more channel downloaders to subscribe from a server computing device.

Figure 5:
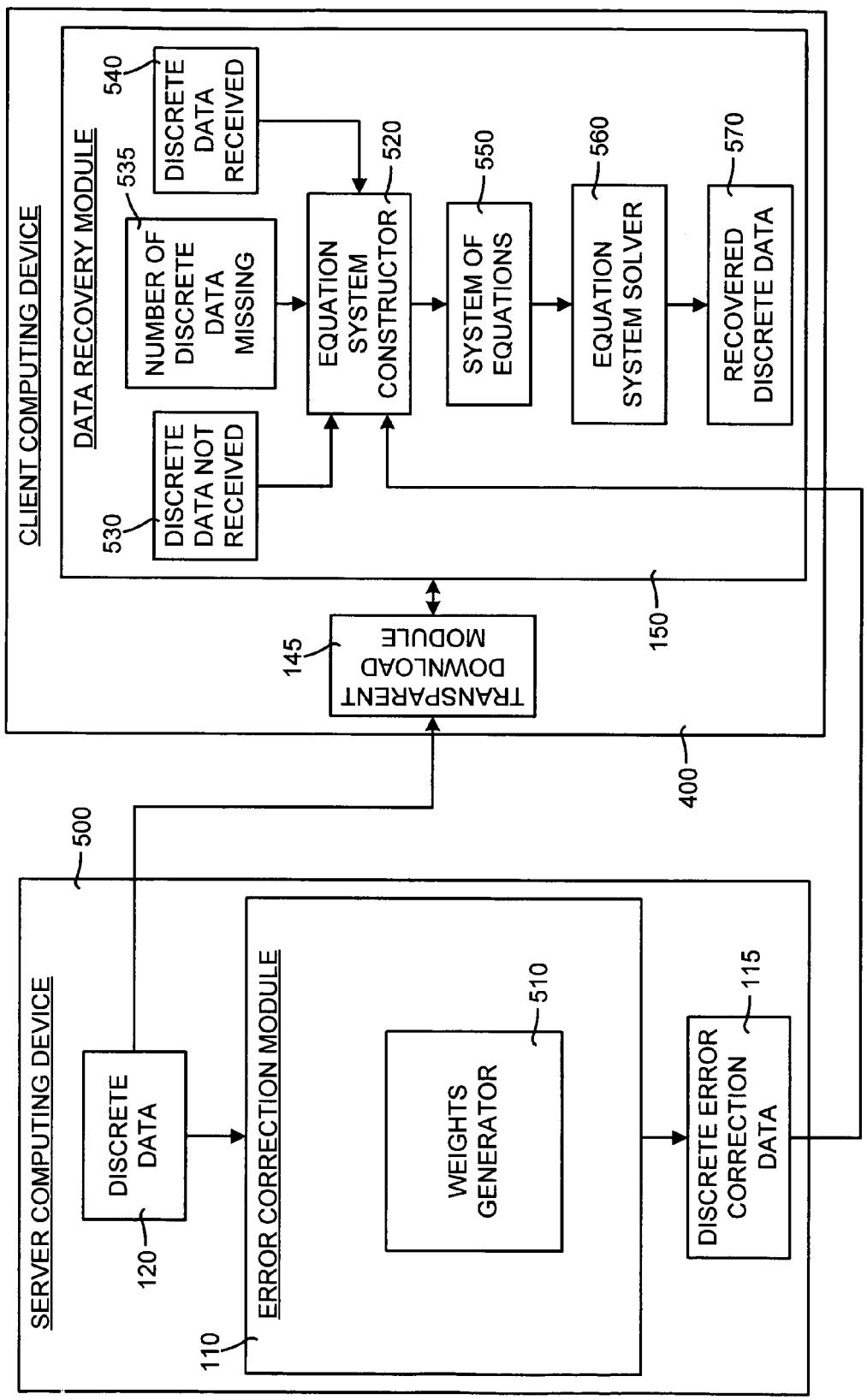
FIG. 5 is a detailed block diagram illustrating the modules of the server computing device and client computing device shown in FIG. 4.

FIG. 5 is a detailed block diagram illustrating the modules of the server computing device and client computing device 400 shown in FIG. 4. Generally, the client computing device 400 subscribes to a server computing device 500 to receive the discrete data 120 and, if needed, the discrete error correction data 115. The server computing device 500 includes the discrete data 120, discrete error correction data 115 and the error correction module 110. The error correction module includes a weights generator 510 that generates weights. The error correction module 110 receives the discrete data 120, processes the discrete data 120 using the weights generator 510, and outputs discrete error correction data 115. Both the discrete data 120 and the discrete error correction data 115 are available to the client computing device 400 upon request.

The client computing device 400 includes the transparent download module 145, as described in detail in FIG. 4, and the data recover module 150. The data recovery module 150 includes an equation system constructor 520, which generates a system of equations from the discrete error correction data 115. The inputs to the equation system constructor 520 are a listing of discrete data not received 530, a number of discrete data that are missing 535, and a listing of discrete data received 540. The output of the equation system constructor 520 is a system of equations 550 which, when solved, recover any missing data packets or discrete data 120.

In addition, the data recovery module 150 includes an equation systems solver 560, which solves the system of equations 550 to recover the missing pieces of discrete data 120. This recovered discrete data 570 represent the pieces of discrete data lost or dropped during transmission or reception.

V. Operational Overview

In general, the method includes provides a transparent use of bandwidth for transferring data along with unique and efficient error recovery. The error recovery provides a means to obtain any lost segments or pieces (such as packets) of discrete data using the segments of discrete data received and a number of discrete error correction data segments equal to the number of lost segments of discrete data plus a safety value. For example, assume that an entire discrete data set includes N pieces of discrete data that k segments of discrete data are lost or missing. This means that (N−k) pieces of discrete data were received. Using the error recovery disclosed herein, the k pieces of lost or missing discrete data can be recovered from the (N−k) pieces of discrete data received and (k+safety value) pieces of discrete error correction data.

Figure 6:
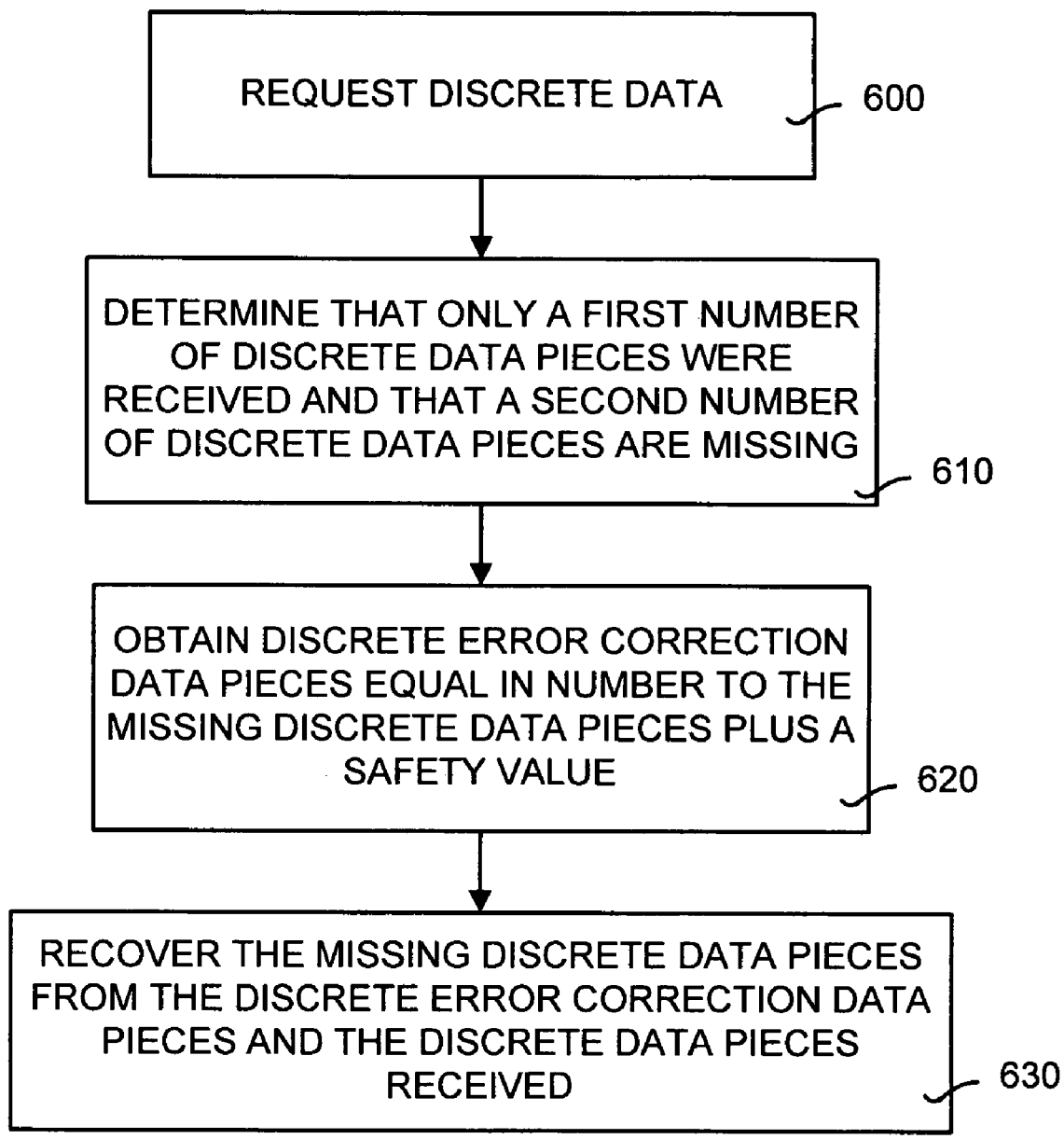
FIG. 6 is a general flow diagram illustrating an operational overview of the electronic data transfer system and method.

FIG. 6 is a general flow diagram illustrating an operational overview of the electronic data transfer system and method. In particular, the discrete data is requested (box 600). By way of example, the discrete data may be requested by a client from a server over a computer network. The discrete data contains pieces of discrete data equal to a total number. Next, it is determined that only a first number of pieces of the discrete data was received, and that a second number of pieces of discrete data are missing or lost (box 610).

Once the loss is discovered, the lost data can be recovered by obtaining pieces of discrete error correction data (box 620). The number of pieces of discrete error correction data needed is equal to the second number plus a safety value. Using the discrete error correction data and the first number of pieces of the discrete data, the missing pieces of discrete data equal can be recovered (box 630).

VI. Operational Details and Working Example

The following working example is used to illustrate the operational details of the invention. This working example is provided as an example of one way in which the electronic data transfer method and components of the electronic data transfer method may be used. It should be noted that this working example is only one way in which the invention may be implemented, and is provided for illustrative purposes only.

Channel Downloader

Figure 7:
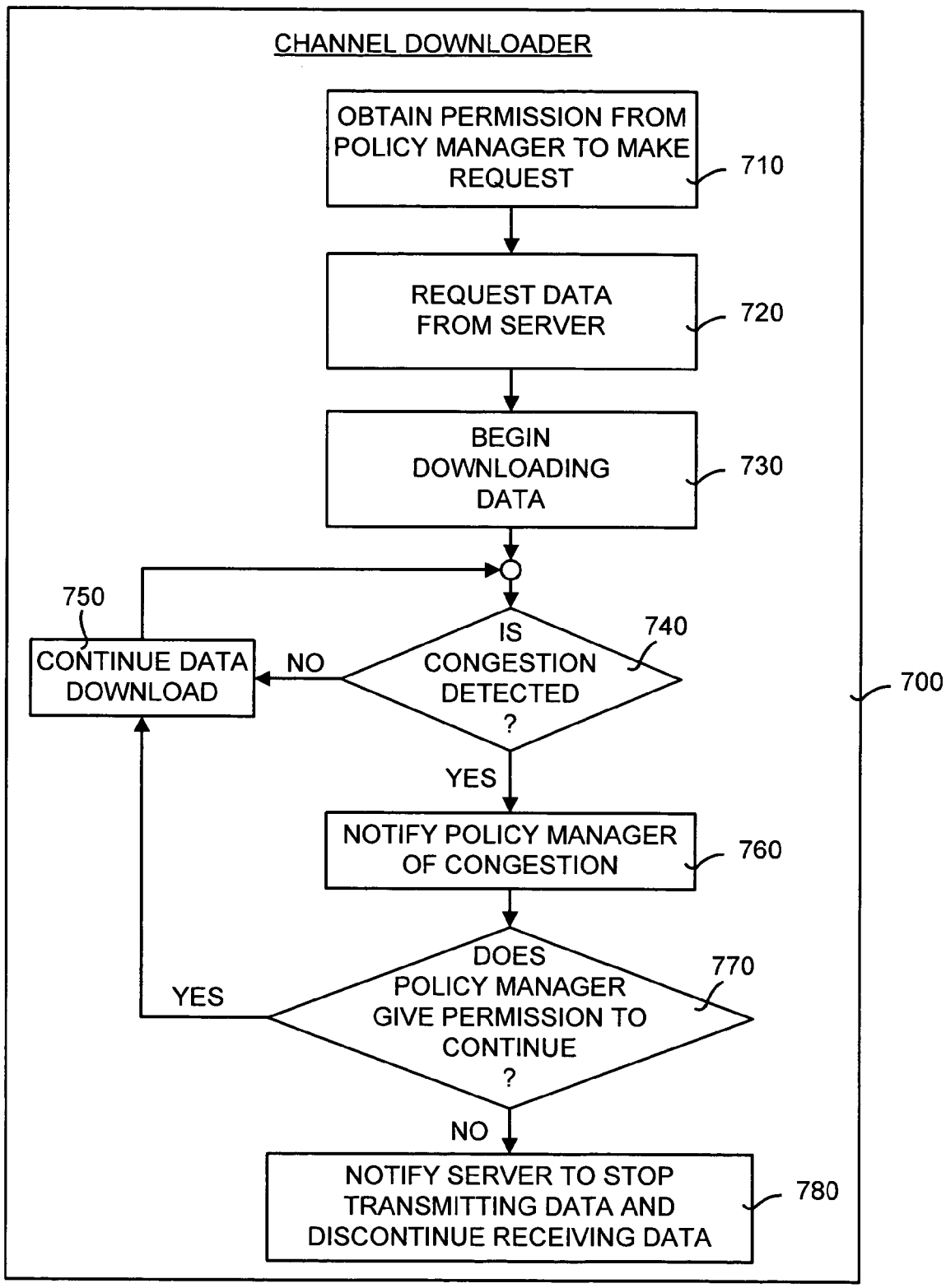
FIG. 7 is a detailed flow diagram illustrating the operational details of a channel downloader, such as the channel downloaders shown in FIG. 4.

FIG. 7 is a detailed flow diagram illustrating the operational details of a channel downloader 700, where the channel downloaders shown in FIG. 4 are examples of the channel downloader 700. The channel downloader allows bandwidth efficient recovery from gaps in data received because of network congestion or voluntarily desubscribing from a channel. In particular, the channel downloader 700 initially must obtain permission from the policy manager to make a request to a server (box 710). If the policy manager allows, the channel downloader 700 request data from the server (box 720) and begins downloading the data (box 730).

Next, a determination is made whether congestion is detected (box 740). If not, then the data downloading continues (box 750) and the check for congestion is performed again. If there is congestion detected the policy manager is notified of the congestion (box 760). A determination then is made whether the policy manager gives permission for the channel downloader 700 to continue the download (box 770). If so, then the data download continues while continually checking for congestion (box 750). Otherwise, the server is notified to stop transmitting data and the channel downloader 700 stops receiving data (box 780).

The working example involves a server and a client connected in a network configuration. The present invention was running as a client application on a Pentium II 450 MHz machine. A plurality of channel downloaders were used to facilitate recovery when the client had to back off due to congestion in the network pipeline. A server contained a file that was divided into N packets, where $x_i$ is the $i^{th}$ packet of the N packet stream. The server also contained an error correction (EC) stream, where $e_j$ is the $j^{th}$ packet of the EC stream. When the client requested the file, the server transmitted the $x_i$ packet in a UDP stream to the client. With each file to be served, the server will server the data packets $x_i$ at a rate $B_d$ and the error correction packets $e_j$ at a rate $B_{ec}$. It should be noted that for multiple channel downloaders each of them do not necessarily need to download data at the same rate.

To obtain a file, the channel downloader on the client first requested the UDP stream $x_i$ and stored the packets as they arrived. The channel downloader periodically sent acknowledgments to the server to signify that the channel downloader was still downloading. Congestion caused some packets to be lost, and the client informed the policy manager. Congestion was detected mainly by noting missing packets from the ordered stream. This information was supplied to the policy manager. Where multiple channel downloaders are present, the policy manager aggregates the information coming from each of the various channel downloaders. Packets may be lost also if the policy manager instructs the channel downloader to desubscribe from the data stream. Either way, the client ended up with less than the total N packets contained in the file.

Using the error recovery of the invention, the channel downloader requested the error correction stream from the server (at a time when the policy manager allows it to do so). Once the client received enough $e_j$s to recover the missing packets, the channel downloader desubscribed from the server. As explained in detail below, the file was successfully decoded. Once this occurred, the channel downloader terminated, thus allowing the policy manager to launch other channel downloaders if the policy manager desires. The channel downloader was able to request either the data stream or the error correction stream when the policy manager gave permission. In addition, the channel downloader had to desubscribe or request that the stream be halted when commanded to do so by the policy manager.

The total number of packets received by the channel downloader was $N-k+k_p$, where k is the number of packets lost and $k_p$ equals k plus a small number of additional packets. By requesting the error correction packets instead of the packets that were lost, the server was spared the burden of fetching specific packets for a specific client. This task does not scale well as the number of clients increases. This is especially important for multicasting, where a server could be easily overwhelmed if it were to accept individual requests from clients.

Policy Manager

Figure 8:
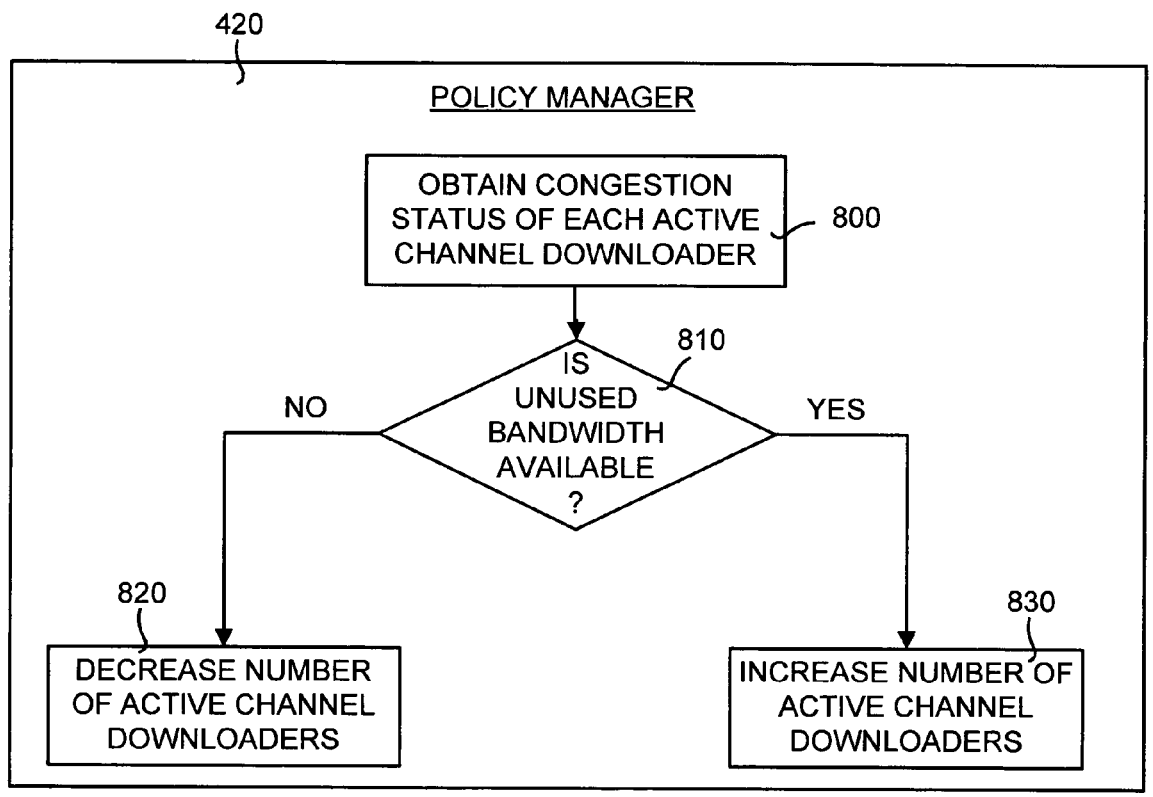
FIG. 8 is a detailed flow diagram illustrating the operational details of the policy manager shown in FIG. 4.

FIG. 8 is a detailed flow diagram illustrating the operational details of the policy manager 420 shown in FIG. 4. The policy manager receives status of congestion in the network connection from each of the channel downloaders (box 800). A determination is made whether there is any unused bandwidth available in the network connection (box 810). If not, then the policy manager 420 decreases the number of active channel downloaders (box 820). If necessary, the number may be reduced to zero so that none of the channel downloaders are active. Otherwise, if there is unused bandwidth available, the policy manager 420 increases the number of active channel downloaders (box 830).

Because channel downloaders do not necessarily have to be at the same rate, the policy manager can intelligently manage how much bandwidth is used based on the rate of each channel downloader. In addition, the policy manager can control which channel downloaders are active in a manner calculated to spread the percentage of lost packets equally across the channels.

In the working example, the client application included a policy manager controlling the channel downloaders. The policy manager dictated when subscribe and desubscribe operations should occur. The policy manager received information from each channel downloader as to whether the channel downloader is experiencing congestion. Based on this information, the policy manager decides how many channel downloaders should be active at any time.

The policy manager generally was an algorithm that accepted as input the congestion status from each active channel downloader. Using the congestion status information, the policy manager decided how many channel downloaders should be active. If there was little or no congestion, the policy manager launched one or more new channel downloaders. In this example, the policy manager increased the number of active channel downloaders by one if there was little or no congestion detected. If there was congestion detected, the policy manager halted active channel downloaders as appropriate. In this example, the policy manager immediately decreased by half the number of active channel downloaders. This alleviated any contention for available bandwidth and made the system transparent. Moreover, in this example the policy manager maintained at least one single active channel downloader to notify the policy manager when network congestion has eased. This generally is acceptable as long as the channel has a very low rate.

Error Recovery

Figure 9:
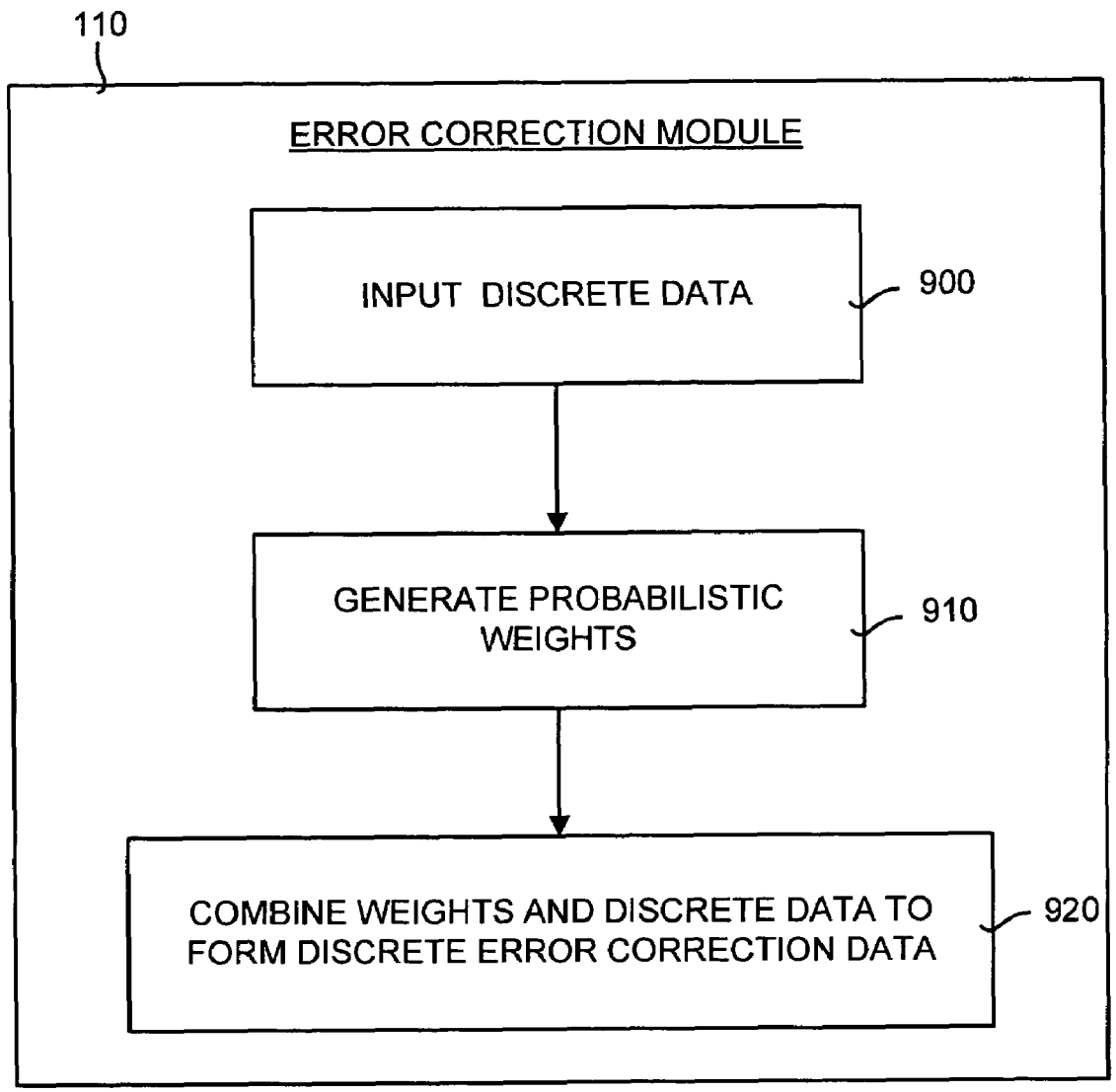
FIG. 9 is a detailed flow diagram illustrating the operational details of the error correction data module residing on the server computing device and shown in FIGS. 1 and 5.

FIG. 9 is a detailed flow diagram illustrating the operational details of the error correction data module residing on the server computing device and shown in FIGS. 1 and 5. In general, the error correction module 110 generates the discrete error correction data. Specifically, the error correction module 110 operates by inputting the discrete data (box 900). Next, probabilistic weights are generated (box 910). The discrete data and probabilistic weights are combined to form the discrete error correction data (box 920). The weights are generated in a probabilistic manner such that each piece of discrete error correction data is a random sampling of all pieces of the discrete data. In other words, the weights are selected such that each piece of discrete error correction data is a unique combination of the discrete data. The weights can be chosen either randomly or deterministically.

Figure 10:
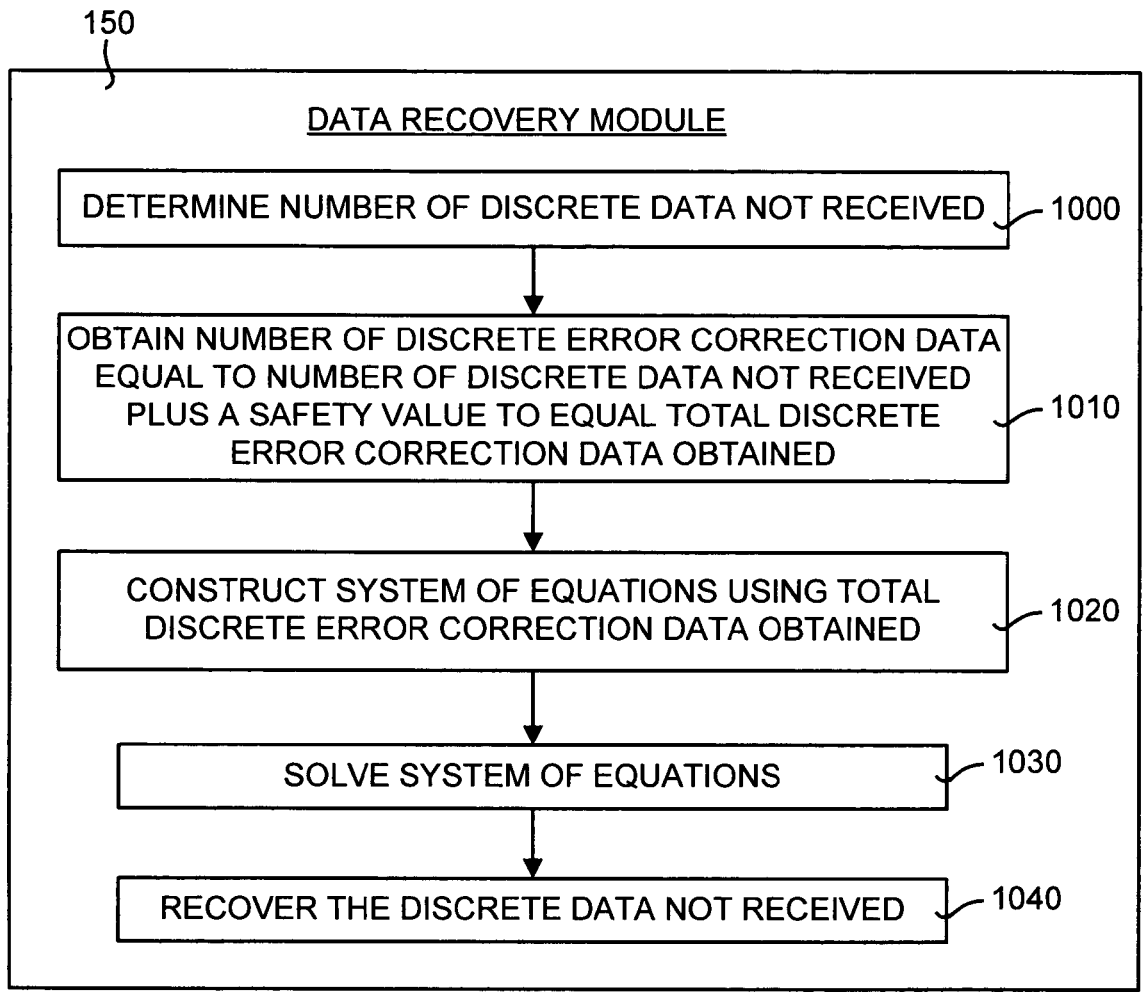
FIG. 10 is a detailed flow diagram illustrating the operational details of the data recovery module residing on the client computing device and shown in FIGS. 1 and 5.

FIG. 10 is a detailed flow diagram illustrating the operational details of the data recovery module 150 residing on the client computing device and shown in FIGS. 1 and 5. The data recovery module 150 uses discrete error correction data to recover any missing or lost pieces of discrete data. In particular, the data recovery module 150 first determines the number of pieces of discrete data not received (box 1000). If all the discrete data was not received, the client listens to the error correction stream to obtain the missing data.

Discrete error correction data is obtained from the server in a quantity that is equal to the number of pieces of discrete data not received plus a safety value (box 1010). This equals the total discrete error correction data obtained. The safety value is a small number that ensures that a system of equations can be solved. There may be some equations that do not uniquely determine a solution, and the safety value ensures that a few more equations are available to overcome this problem should it arise. The safety value is dependent on the number of weights selected and the number of discrete data not received. A general rule of thumb is that the safety value should be approximately 3% of the number of pieces of discrete data not received.

The system of equations is constructed using the total discrete error correction data obtained (box 1020). In general, the system of equations is a linear system of equations. This system of equation is solved (box 1030) to recover the missing pieces of discrete data (box 1040).

Mathematical Details of Error Recovery:

Following are the mathematical details of the error correction and recovery method of the invention. Assume that each data channel is served in packets and that $x_i$ is the $i^{th}$ packet of an N packet data stream. An error correction (EC) stream is formed for each of the channels, $e_j = \Sigma_i x_i b_{ij}$, where $e_j$ is the $j^{th}$ packet of the EC stream, the $b_{ij}$s are weights (equal to either zero or one), and all sums are modulo 2. Suppose that N−k packets from the data stream have been received by the client, in other words, k packets have been lost or are missing due to congestion or other losses. In order to repair these losses, the client receives some of the EC packets. Suppose that the client receives any $k_p$ of the EC packets, in any order. Thus, the client receives $e_j$ where j are any set of $k_p$ unique indices. Denote by P a set containing the indices of the received EC packets. This gives, $$e_j = \sum_{i=0}^{N-1} x_i b_{ij}, \; j \in R$$
$$= \sum_{i \in A} x_i b_{ij} + \sum_{i \notin A} x_i b_{ij}, \; j \in R$$

so that, $$\sum_{i \in A} x_i b_{ij} = e_j - \sum_{i \notin A} x_j b_{ij}, \; j \in R \quad (1)$$

or, in matrix form, $$A \, x_{unknown} = e - B \, x_{known}$$

where $x_{unknown}$ is a kx1 vector containing the missing packets, $x_{known}$ is a N−kx1 vector containing the packets received, e is a $k_p$x1 vector containing the error correction packet $e_j$ received, and A and B are matrices containing the weights $b_{ij}$ that relate each error correction $e_j$ to the data packets $x_i$ (these are of dimensions $k_p$xk and $k_p$xN−k, respectively).

This is a system of $k_p$ equations having k unknowns (the missing packets). The system of equations can be solved for the unknowns so long as $k_p \geq k$, and the system is non-singular. This is true independently of A (the indices of the missing packets) and R (the indices of the EC packets received). In other words, it does not matter which k packets were lost and which $k_p$ EC packets were received. The system of equations can be solved using any standard equation solving method, such as, for example, Gaussian elimination with pivoting followed by back-substitution. The size of the system to be solved is determined by the number of missing packets. In general, it is required that $k_p$ exceed k by some amount to increase the probability that the system can be solved.

The weight $b_{ij}$ should be chosen so that the sequences $b_{ij}$ for I=0, 1 . . . , N−1 are in general all different. Thus, each EC packet $e_j$ will be a unique combination of the data packets. The weights can be chosen at random or deterministically. For example, set $b_{ij}$ to be zero or one with probability one-half. Clearly, there is a large number of possible $b_{ij}$ sequences. Thus, there is no difficulty in generating a long stream of EC packets, if necessary. Note that for an error packet to be useful in solving equation (1) it must be constructed of at least one missing packet.

It should be noted that in the above discussion redundancy of the of the error correction (kp−k)/(N+kp−k) is determined by the weights $b_{ij}$ and there is no concept of minimum distance. Thus, the error correction method is not comparable to block codes.

Blocking

Blocking involves the breaking down of large files into smaller blocks to reduce the size of the system of equations needed to be solved. The limit on the number of errors that can be corrected for a stream of length N will be determined by the largest system of equations that it is feasible to solve. By way of example, with N=1000, a 3% loss would imply k=30, and would require solving of system in 30 unknowns. Larger files can be broken into more manageable independent blocks. For example, a file with 1×10⁶ packets could be broken into 100 blocks of 10000 packets each. Thus, a 3% loss could be repaired by solving 100 systems in 300 unknowns rather than the computationally challenging task of solving one system in 3×10⁴ unknowns.

The form of the block decomposition should be to ensure that common forms of packet loss, such as desubscribing and congestion losses, result in uniform losses from all blocks, rather than many losses from a single block. One approach is to assign packets to blocks in a round robin manner.

In the working example, the error correction and recovery running on the Pentium II 450 MHz machine took 192 seconds to invert all 100 systems. This does not include time to read the data from the disk. Since the sum on the right-hand side of equation (1) involves reading the entire file once, it can be seen that computation time becomes small relative to disk access, which dominates. Calculating the right-hand side involves storing a running sum of 300×1 kilobyte for each of the 100 blocks. This implies a requirement of 30 megabytes of RAM. Thus, the error correction and recovery system and method of the invention are well within the means of even a client having modest computing resources.

What is claimed is:

1. A method for transferring a data file over a fixed bandwidth network connection, comprising: subscribing to at least a portion of a plurality of channels contained on the fixed bandwidth network to receive discrete data packets of the data file; determining a congestion status within the fixed bandwidth network connection; unsubscribing from at least one of the plurality of channels if the congestion status detects congestion and subscribing to additional ones of the plurality of channels if the congestion status detects little or no congestion; and recovering any discrete data packets of the data file lost during data transfer using discrete error correction data packets and a safety value.

2. The method of claim 1, further comprising determining a number of discrete data packets of the data file lost during data transfer, wherein a number of discrete error correction data packets recovered is equal to a number of discrete data packets of the data file lost during data transfer plus the safety value.

3. The method of claim 2, wherein the safety value is equal to approximately 3% of the number of discrete data packets of the data file lost during data transfer.

4. The method of claim 2, further comprising constructing a system of equations equal to the number of discrete data packets of the data file lost during data transfer plus the safety value.

5. The method of claim 1, wherein determining a congestion status further comprises noting a rate at which the discrete data packets are being lost.

6. The method of claim 1, wherein determining a congestion status further comprises having an application on the client computer device send a notification of the applications intent to use at least a portion of the fixed bandwidth network connection.

7. The method of claim 1, wherein the discrete error correction data packets are a weighted combination of the discrete data packets.

8. A method for transferring a data file to a client computing device over a plurality of channels contained within a fixed bandwidth network connection, comprising: determining a congestion status within the fixed bandwidth network connection; unsubscribing from at least one of the plurality of channels if the congestion status detects congestion and subscribing to additional ones of the plurality of channels if the congestion status detects little or no congestion; recovering any discrete data packets of the data file lost during data transfer using discrete error correction data packets, wherein each one of the discrete error correction data packets is a weighted combination of the discrete data packets; and generating the discrete error correction data packets by combining probabilistic weights and the discrete data packets.

9. The method of claim 8, wherein the discrete error correction data packets are a linear, weighted combination of the discrete data packets.

10. The method of claim 8, further comprising determining the congestion status based on how much data is lost during transfer over the plurality of channels.

11. The method of claim 8, further comprising determining the congestion status based on a notification that other sources will be using the fixed bandwidth network connection.

12. The method of claim 8, further comprising constructing a system of equations from the discrete error correction data packets.

13. A method for transferring a data file to a client computing device using a plurality of channels contained within a fixed bandwidth network connection, comprising: subscribing to at least a portion of the plurality of channels to receive discrete data packets of the data file; recovering any discrete data packets of the data file lost during data transfer using discrete error correction data packets; and using a policy manager residing on the client computing device to control how the plurality of channels are used to receive the discrete data packets of the data file and the discrete error correction data packets.

14. The method of claim 13, further comprising using the policy manager to unsubscribe from at least one of the plurality of channels if the policy manager detects network congestion.

15. The method as set forth in claim 14, further comprising having the policy manager receive a notification from an application of the applications intent to use at least a portion of the fixed bandwidth network connection.

16. The method of claim 14, further comprising using the policy manager to subscribe to additional ones of the plurality of channels if the policy manager detects little or no network congestion.

17. The method of claim 16, further comprising determining network congestion by analyzing a rate at which the discrete data packets are being lost.

18. The method of claim 13, wherein the discrete error correction data packets are a weighted combination of the discrete data packets.

* * * * *